United States Patent
Kuzuyama (10) Patent No.: US 7,210,457 B2
(45) Date of Patent: May 1, 2007

(54) HOMOGENEOUS CHARGE COMPRESSION IGNITION INTERNAL COMBUSTION ENGINE

(75) Inventor: Hiroshi Kuzuyama, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/448,275

(22) Filed: Jun. 6, 2006

(65) Prior Publication Data

US 2006/0272616 A1 Dec. 7, 2006

(30) Foreign Application Priority Data

Jun. 6, 2005 (JP) ............................. 2005-165176

(51) Int. Cl.
*F02B 7/08* (2006.01)
*F02B 11/00* (2006.01)

(52) U.S. Cl. .................... 123/435; 123/305; 123/90.15

(58) Field of Classification Search .. 123/90.15–90.18, 123/294, 305, 435
See application file for complete search history.

(56) References Cited

U.S. PATENT DOCUMENTS 6,354,264 B1 * 3/2002 Iwakiri et al. .............. 123/305

7,128,048 B2 * 10/2006 Yamoaka et al. ........... 123/305
2006/0191513 A1 * 8/2006 Gray, Jr. .................... 123/435
2006/0196466 A1 * 9/2006 Kuo et al. ................ 123/90.15

FOREIGN PATENT DOCUMENTS

| JP | 2003-003873 | 1/2003 |
|----|-------------|--------|
| JP | 2004-190539 | 7/2004 |

\* cited by examiner

*Primary Examiner*—Erick Solis
(74) *Attorney, Agent, or Firm*—Morgan & Finnegan, L.L.P.

(57) ABSTRACT

An engine includes cylinders, a sensor for detecting information related to combustion states of the cylinders. Each cylinder is provided with an ignition device, an intake valve, and an exhaust valve. The engine also includes a control apparatus that obtains the information from the sensor. Based on the information from the sensor, the control apparatus identifies a cylinder of the most violent combustion. The control apparatus controls at least one of the valve timing of the intake valves, the valve timing of the exhaust valves, and a fuel injection amount to the cylinders, thereby suppressing the combustion of all the cylinders, such that the combustion state of the identified cylinder becomes an appropriate combustion state. As for a cylinder the combustion state of which is out of a predetermined range and is a state causing misfire, the control apparatus selectively activates the corresponding ignition device to perform assisted ignition. This configuration reduces variation in the combustion states among the cylinders.

9 Claims, 5 Drawing Sheets

HOMOGENEOUS CHARGE COMPRESSION IGNITION INTERNAL COMBUSTION ENGINE

BACKGROUND OF THE INVENTION

The present invention relates to homogeneous charge compression ignition (HCCI) internal combustion engine having a plurality of cylinders. More specifically, the present invention relates to control for reducing variation of combustion states among the cylinders.

In a typical HCCI internal combustion engine, fuel and air is premixed before reaching cylinders. The mixture is compressed by pistons to self-ignite. This type of engine is similar to a diesel engine in that compression ignition is performed without spark plugs. On the other hand, the engine is similar to a gasoline engine in that fuel is premixed with air before being igniting. This type of engine thus has a quality between a diesel engine and a gasoline engine.

This type of internal combustion engine provides various advantages such as high heat efficiency, improved fuel consumption, reduction in the emission harmful substances such as soot and NOx. Research and development of this engine have been thus enhanced. One of major obstacles to the practical application of HCCI internal combustion engines is that control of ignition and combustion is difficult as compared to diesel engines and gasoline engines.

That is, in a diesel engine or a gasoline engine, it is possible to perform ignition at the most appropriate time about the piston top dead center by adjusting the timing to inject fuel into the cylinder or the timing to cause the spark plug to spark. On the other hand, in the case of an HCCI engine, fuel and air are mixed in advance, and the mixture is compressed so that it spontaneously self-ignite. Thus, control factors including the temperature, pressure, and fuel concentration must be appropriately controlled such that self-ignition occurs around the piston top dead center. This makes the control extremely difficult. Therefore, the engine can be operated only in a narrow range where such control is not difficult.

On this point, Japanese Laid-Open Patent Publication No. 2004-190539 points out the following. That is, in a multi-cylinder two-cycle engine, the efficiency of scavenging can vary from one cylinder to another due to pressure pulsation in the intake pipes and exhaust pipes. As a result, the combustion state varies from one cylinder to another. Therefore, application of HCCI to a multicylinder two-cycle engine substantially reduces the range of operating condition in which compression ignition can be performed.

The above publication discloses an improved engine to solve the problem. The disclosed engine includes a sensor for detecting combustion state information related to the combustion state in each combustion chamber. The engine also includes a computation section that, based on information detected by the sensor, computes a specific combustion state index representing the combustion state in each combustion chamber. The computation section also computes an average combustion state index, which is the mean value of the combustion state indexes of all the combustion chambers. Further, the engine includes a combustion control parameter adjusting section that determines whether the combustion state index in each combustion chamber is in a predetermined permissible range around the average combustion state index. When the combustion state index of a combustion chamber is out of the permissible range, the combustion control parameter adjusting section adjusts a combustion control parameter of the combustion chamber, such that the combustion states of all the combustion chambers approach one another.

Specifically, the combustion control parameter adjusting section increases or reduces the fuel injection for each combustion chamber, or advances or retards the closing timing of the intake valve of each combustion chamber, thereby causing the combustion states of all the combustion chambers to resemble one another.

Since the engine of the above publication operates with all the combustion chambers in similar combustion states, compression ignition is prevented from being inappropriate in some of the combustion chambers. As a result, the range of compression ignition operation of the entire engine is expanded.

However, changing of the fuel injection amount or valve closing timing of the intake valves requires a structure for changing the fuel injection amount for each cylinder or a mechanism for changing the valve closing timing of the intake valve for each cylinder. This complicates the structure and thus hinders reduction in the weight and simplification of the control.

SUMMARY OF THE INVENTION

Accordingly, it is an objective of the present invention, in a homogeneous charge compression ignition internal combustion engine having a plurality of cylinders, to reduce variation of the combustion states among the cylinders and to allow the engine to operate highly efficiently with low emission of NOx.

To achieve the foregoing objective, one aspect of the present invention provides a homogeneous charge compression ignition internal combustion engine including a plurality of cylinders, a sensor for detecting information related to combustion states of the cylinders, ignition devices, intake valves, exhaust valves, and a control apparatus. Each cylinder is provided with one of the ignition devices, one of the intake valves, and one of the exhaust valves. The control apparatus obtains the information related to the combustion states of the cylinders from the sensor. Based on the information related to the combustion states of the cylinders obtained from the sensor, the control apparatus identifies a cylinder of the most violent combustion, and controls at least one of the valve timing of the intake valves, the valve timing of the exhaust valves, and a fuel injection amount to the cylinders, thereby suppressing the combustion of all the cylinders, such that the combustion state of the identified cylinder becomes an appropriate combustion state. As for a cylinder the combustion state of which is out of a predetermined range and is a state causing misfire, the control apparatus selectively activates the corresponding ignition device to perform assisted ignition.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
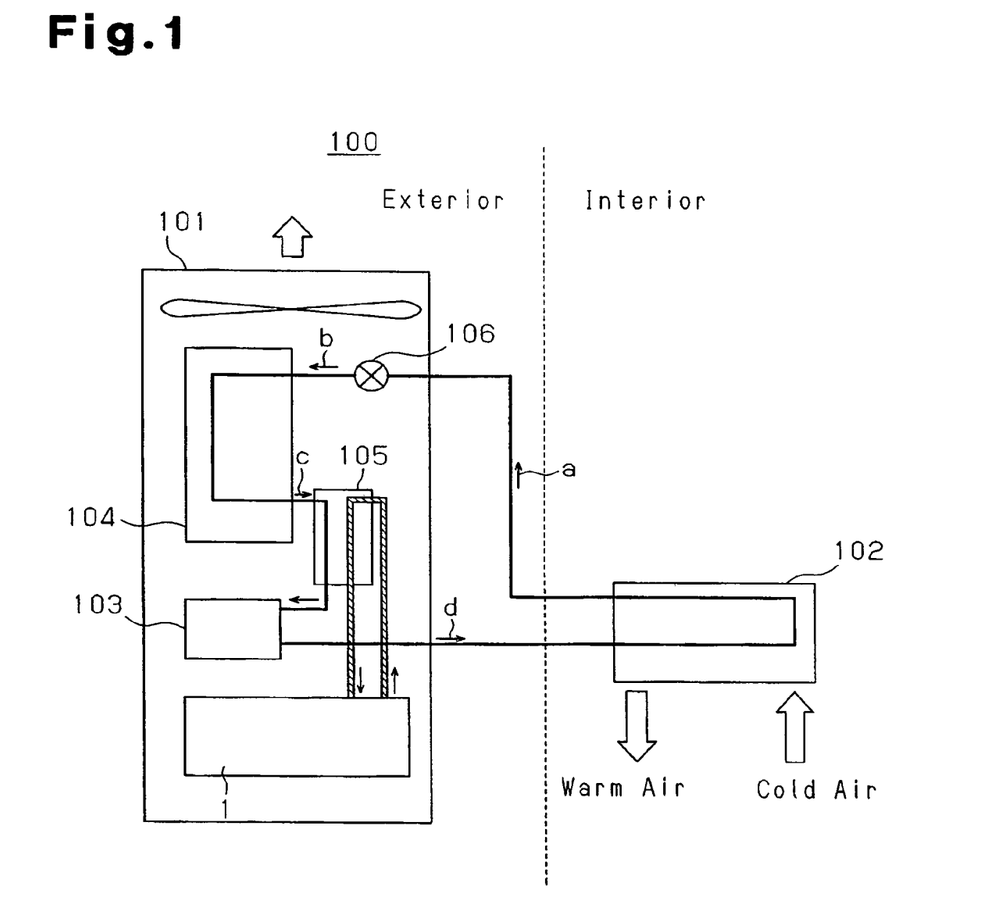
FIG. 1 is a system diagram showing a gas heat pump equipped with an internal combustion engine according to one embodiment of the present invention.

FIG. 1 is a system diagram showing a gas heat pump 100 equipped with an internal combustion engine 1 according to one embodiment of the present invention. By means of the internal combustion engine 1 that uses town gas (natural gas), the gas heat pump 100 drives heat pump cycle for air conditioning. FIG. 1 shows the system when the gas heat pump 100 functions as a heating cycle.

The gas heat pump 100 includes an outdoor unit 101 and an indoor unit 102. The outdoor unit 101 includes the internal combustion engine (gas engine) 1, a compressor 103 driven by the engine 1, heat exchangers 104, 105, and an expansion valve 106.

Refrigerant is condensed and liquefied at the heat exchanger in the indoor unit 102 and discharges heat, thereby heating the interior. The refrigerant then flows along arrow a and passes the expansion valve 106. The refrigerant then becomes low temperature low pressure liquid. Thereafter, the refrigerant flows along arrow b and evaporates at the heat exchanger 104 in the outdoor unit 101, and absorbs heat. The refrigerant then becomes low temperature low pressure gas. Subsequently, the refrigerant flows along arrow c and is compressed by the compressor 103. The refrigerant becomes high temperature high pressure gas, accordingly. Then, the refrigerant flows along arrow d and is liquefied at the indoor unit 102 to discharge heat. The heating cycle is repeated in the gas heat pump 100. FIG. 1 exemplifies a cycle in which exhaust heat of the engine 1 is used to circulate hot water, and a heat exchange cycle is carried out between the refrigerant and the hot water at the heat exchanger 105.

Figure 2:
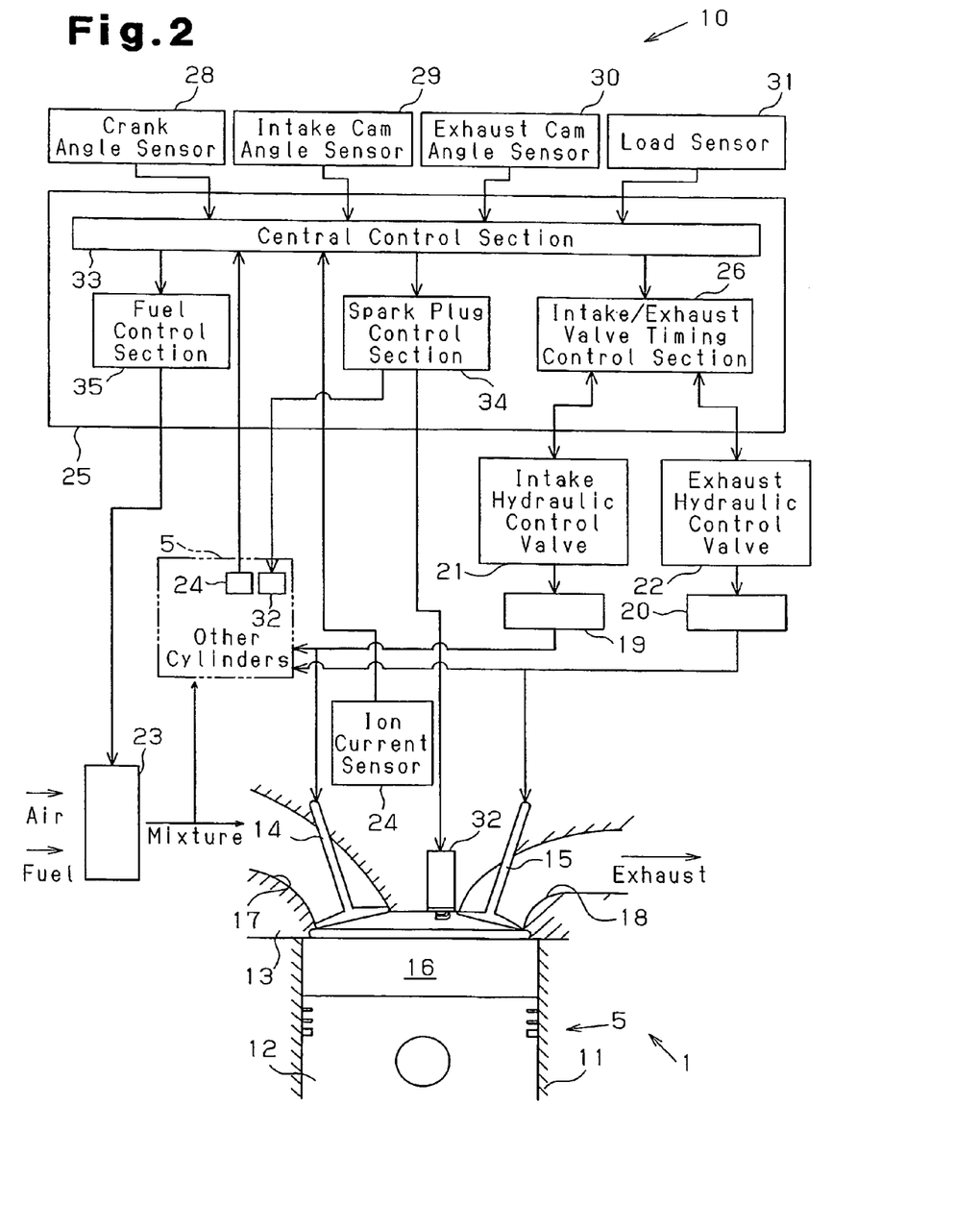
FIG. 2 is a diagrammatic view showing the engine shown in FIG. 1 with a block diagram showing a configuration for control.

Hereafter, the internal combustion engine 1 according to this embodiment will now be described. FIG. 2 is a diagrammatic view showing the engine 1 with a block diagram showing a configuration for control.

Referring to FIG. 2, the engine 1 includes a cylinder block 11, pistons 12, a cylinder head 13, intake valves 14, and exhaust valves 15. The engine 1 has a plurality of cylinders 5, the number of which is four in this embodiment. For convenience of illustration, two of the four cylinders 5 are shown in FIG. 2, and one of the cylinders 5 in FIG. 2 is illustrated schematically.

The cylinder block 11, the pistons 12, and the cylinder head 13 define a combustion chamber 16 in each of the cylinders 5. Pairs of an intake port 17 and an exhaust port 18 are formed in the cylinder head 13. Each pair of the intake and exhaust ports 17, 18 corresponds to one of the cylinders 5.

The engine 1 includes an intake camshaft and an exhaust camshaft (not shown) corresponding to the intake valves 14 and the exhaust valves 15, respectively. Variable valve timing mechanisms 19, 20 are provided at the intake and exhaust camshafts, respectively, to independently vary the valve timing of the intake and exhaust valves 14, 15. The variable valve timing mechanisms 19, 20 adjust the rotational phase of the camshafts relative to a crankshaft (not shown), thereby simultaneously changing the opening timing and closing timing of the intake valves 14 and the exhaust valves 15 for all the cylinders 5.

The variable valve timing mechanisms 19, 20 are connected to an intake hydraulic control valve 21 and an exhaust hydraulic control valve 22, respectively. Hydraulic pressure in the hydraulic control valves 21, 22 is controlled to permit the variable valve timing mechanisms 19, 20 to adjust the valve timing of the intake valves 14 and exhaust valves 15. As this configuration, for examples, the one disclosed in Japanese Laid-Open Patent Publication No. 2001-355462 may be employed. Also, any configuration other than the one disclosed in the publication may be employed.

The internal combustion engine 1 is a homogeneous charge compression ignition (HCCI) internal combustion engine and draws in mixture of fuel and air that has been mixed in advance. After fuel gas (natural gas) is mixed with intake air by a mixer 23, the mixture is distributed to the cylinders 5 as shown in FIG. 2. Specifically, the mixture is drawn into each combustion chamber 16 through the associated intake port 17.

The internal combustion engine 1 also includes ion current sensors 24 and spark plugs 32, each corresponding to one of the cylinders 5. Each ion current sensor 24 detects information related to combustion state in the corresponding combustion chamber 16. Each spark plug 32 functions as assisted ignition means or an ignition device.

Next, a control apparatus 10 for the engine 1 will be described. Referring to FIG. 2, the engine control apparatus 10 includes the variable valve timing mechanisms 19, 20 for varying the valve timing of the intake and exhaust valves 14, 15, the hydraulic control valves 21, 22, and an engine control unit (ECU) 25 that performs various control procedures of the engine 1.

The ECU 25 includes a central control section 33, an intake/exhaust valve timing control section 26 for controlling the variable valve timing mechanisms 19, 20, a spark plug control section 34 for controlling ignition of the spark plugs 32 for each cylinder 5, and a fuel control section 35 for controlling a fuel injection valve (not shown).

Further, the ECU 25 is electrically connected to a crank angle sensor 28, an intake cam angle sensor 29, an exhaust cam angle sensor 30, a load sensor 31, and the ion current sensors 24 provided for each of the cylinders 5. Measurement results of these sensors are sent to the ECU 25 as signals.

The crank angle sensor 28 is located in the vicinity of the crankshaft (not shown) and outputs a crank angle signal at every predetermined crank angle. The intake cam angle sensor 29 and the exhaust cam angle sensor 30 are located in the vicinity of the intake camshaft and the exhaust camshaft, respectively, and each output a cam angle signal at every predetermined cam angle.

The load sensor 31 outputs a target operational condition of the indoor unit 102 (FIG. 1) as a load signal. The load sensor 31 may detect the operational condition of the compressor 103 and output the resultant as a load signal.

The hardware components (not shown) of the ECU 25 include a CPU, a ROM., and a RAM. The ROM is a read-only memory and stores various programs used for controlling the operation of the engine 1. The CPU executes computations and processes based on various received signals and programs stored in the ROM, thereby controlling the hydraulic control valves 21, 22, the spark plugs 32, and the fuel injection valve. By combining the hardware and software components, the ECU 25 functions as the central control section 33, the intake/exhaust valve timing controlling section 26, the spark plug control section 34, and the fuel control section 35.

An ignition control process in the engine 1 will now be described with reference to FIG. 3. The process is repeatedly executed at predetermined time interval (for example, several milliseconds)

Figure 3:
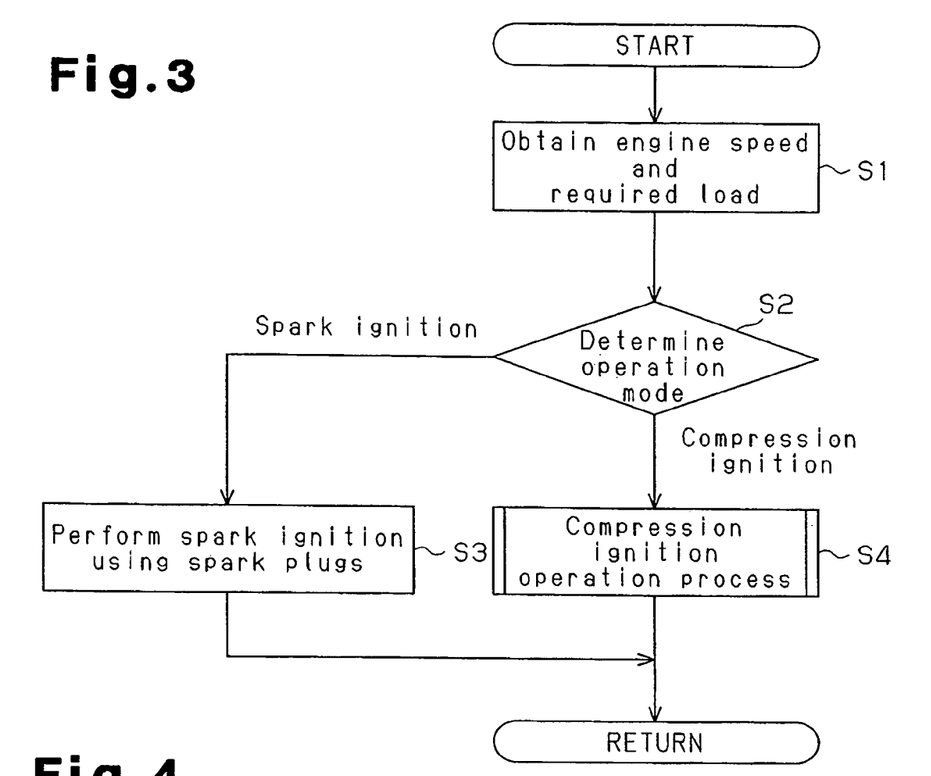
FIG. 3 is a flowchart showing an ignition control process of the internal combustion engine shown in FIG. 1.

At step S1 in the main routine of the ignition control shown in FIG. 3, based on signals from the crank angle sensor 28 and the load sensor 31, the CPU computes and obtains the current engine speed and the required load.

Figure 4:
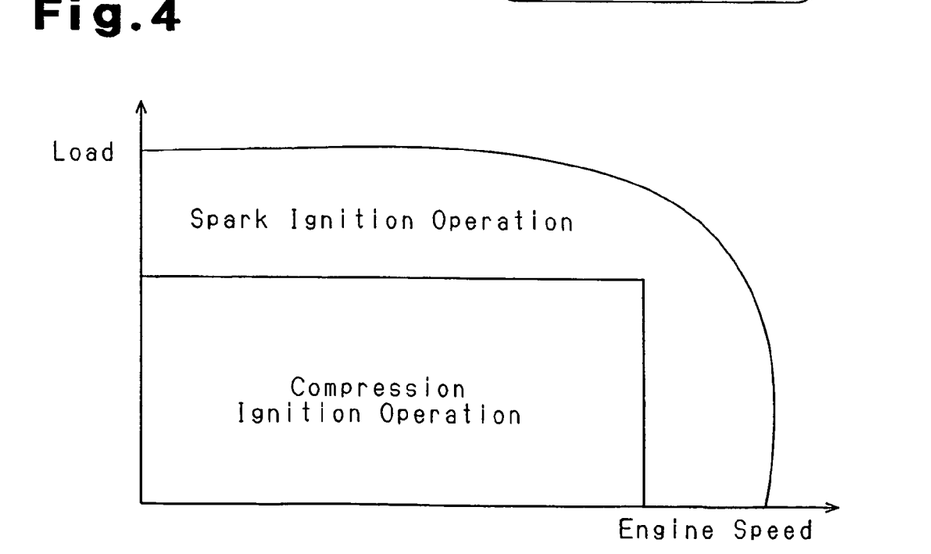
FIG. 4 is a diagram showing an ignition control map used in the ignition control process shown in FIG. 3.

At step S2, the CPU checks the obtained engine speed and the load against an ignition control map stored in the ROM to determine whether to execute spark ignition or compression ignition. For example, a map shown in FIG. 4 is used as the ignition control map. If the engine speed is greater than a predetermined value or if the required load is greater than a predetermined value, spark ignition is selected. Under other conditions, the compression ignition is selected. The determination does not necessarily based on reference to a map, but may be performed by applying an appropriate determination formula to select either the spark ignition or the compression ignition.

In the case where the spark ignition is selected at step S2, the CPU proceeds to step S3. The CPU controls the variable valve timing mechanisms 19, 20 by means of the intake/exhaust valve opening timing control section 26 such that the valve timing is the same as that in a normal spark ignition engine, and controls the spark plugs 32 by means of the spark plug control section 34, thereby executing the spark ignition. On the other hand, when the compression ignition is selected, the CPU executes a subroutine of a compression ignition operation process at step S4, which will be discussed below.

The subroutine of the compression ignition operation process will now be described with reference to FIG. 5. In the subroutine of the compression ignition operation process, the CPU at step S101 sets control values of the valve timing of the intake valves 14 and the exhaust valves 15 according to the load obtained at step S1 of the main routine (FIG. 3).

Figure 6:
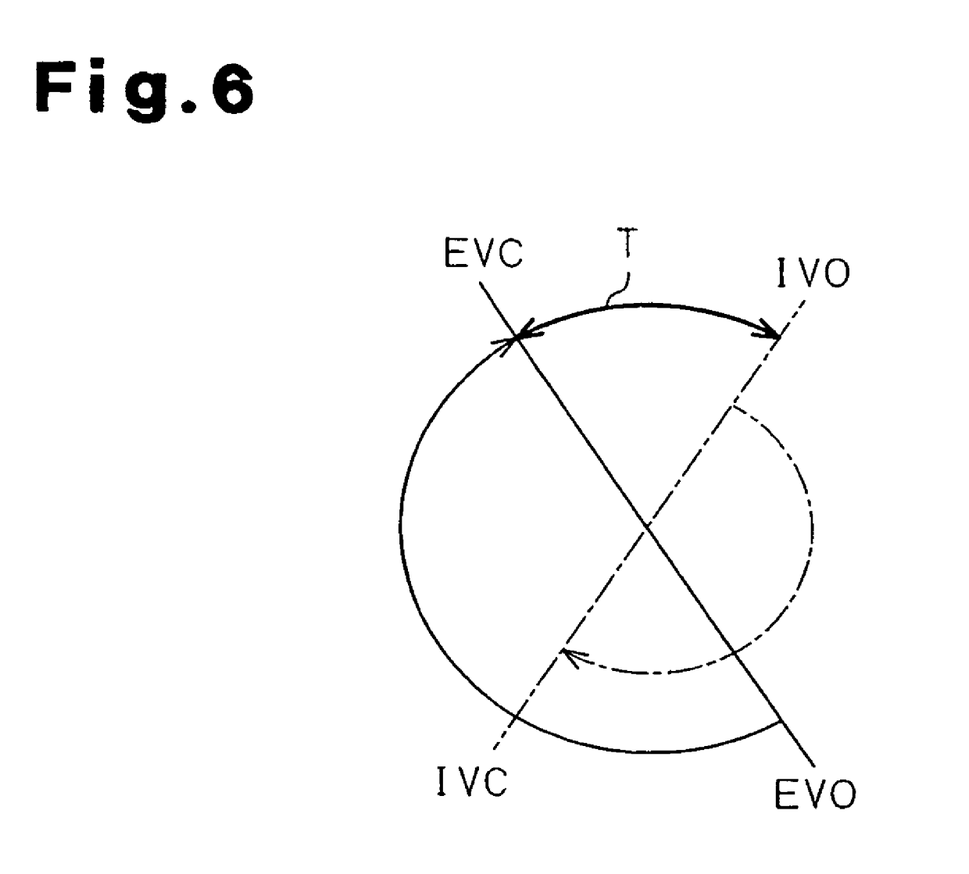
FIG. 6 is a diagram schematically showing opening and closing timing of an intake and exhaust valves of the internal combustion engine of FIG. 1.

In connection with the above points, FIG. 6 schematically shows an example of the valve timing of the intake valve 14 and the exhaust valve 15 of each cylinder 5 in the compression ignition operation. As shown in FIG. 6, from the exhaust stroke to the intake stroke, closing timing of the exhaust valve 15 (EVC) is controlled to be advanced relative to the exhaust top dead center. Also, the opening timing of the intake valve 14 (IVO) is controlled to be delayed relative to the exhaust top dead center. As a result, a negative valve overlap period T is provided in which the exhaust valve 15 and the intake valve 14 are both closed around the exhaust top dead center.

According to this control process, when the expansion stroke ends and the exhaust stroke starts, exhaust gas after combustion (burned gas) is discharged through the exhaust port 18 as the piston 12 is moved upward. However, since the exhaust valve 15 is closed at a time advanced relative to the exhaust top dead center (EVC in FIG. 6), the burned gas is thereafter trapped in the compression chamber 16. The trapped gas is referred to as residual gas (EGR gas).

At a time retarded relative to the exhaust top dead center (IVO in FIG. 6), the intake valve 14 is opened, premixed air-fuel mixture is supplied from the mixer 23 through the intake port 17 and mixed with the EGR gas in the combustion chamber 16. As a result, the EGR gas, which has been burned and has a high temperature, heats the mixture, thereby improving the ignitability of the mixture.

When setting of the control value of the valve timing performed in step S101, the closing timing of the exhaust valve 15 is advanced and the opening timing of the intake valve 14 is retarded as the load is decreased. To the contrary, as the load is increased, the closing timing of the exhaust valve 15 is retarded and the opening timing of the intake valve 14 is advanced.

Accordingly, a great amount of high temperature internal EGR gas is trapped when the load is low. This permits the compression ignition of a lean mixture to be sufficiently and stably performed. That is, the fuel economy in the low load operation is improved, and the emission of NOx is reduced. On the other hand, the amount of high temperature internal EGR gas is reduced as the load is increased. This prevents knocking from occurring.

The valve timing control value at step S101 is provisional. The actual valve timing control at step S108 is executed based on a value obtained by correcting the control value as necessary according to a predetermined procedure (step S104, which will be discussed below).

At step S102, the CPU obtains the crank angle based on a signal from the crank angle sensor 28, and the combustion states of each cylinder 5 from the ion current sensors 24. Based on the obtained information, the CPU computes the ignition timing in each cylinder 5. In this embodiment, the current flowing through each ion current sensor 24 increases as the combustion of compression ignition progresses. Thus, for example, the ignition timing of each cylinder 5 can be computed by determining the time at which a computed value obtained from the waveform of the current surpasses a predetermined value.

In each cylinder 5, the timing of ignition computed in the above described manner is preferably in a range retarded relative to the compression top dead center by not less than 1° and not more than degree to 8°. That is, if the ignition timing is more advanced than the above range, the combustion becomes violent, which increases the amount of NOx. On the other hand, if the ignition timing is more retarded than the above range, misfire is likely to occur, which increases the amount of HC and CO.

It is inevitable that the ignition timing (combustion states) varies among the cylinders 5. It is preferable to control the combustion states to suppress such variation, so that the ignition in all the cylinders 5 occurs in the above range.

Thus, in this embodiment, one of the four cylinders 5 in which the ignition timing is most advanced (in other words, the cylinder 5 the combustion state of which is the most violent) is identified at step S102. At step S103, whether the ignition timing in the identified cylinder 5 is more advanced than the above mentioned range is determined. If the ignition timing is determined to be more advanced than the range, the CPU corrects the control value of the valve timing obtained at step S101 to a value suppressing combustion at step S104 so that the ignition timing of the cylinder 5 is within the range.

Specifically, the correction is carried out by advancing the opening timing of the intake valve 14 (IVO in FIG. 6) while retarding the closing timing of the exhaust valve 15 (EVC in FIG. 6). This shortens the negative valve overlap period T, and thus reduces the amount of the trapped high temperature EGR gas. Accordingly, the degree by which the air-fuel mixture is heated is reduced. As a result, the ignitability of the mixture is reduced.

The degree of correction (correction amount) of the valve timing control value can be determined in reference to a predetermined map or a formula based on the degree by which the ignition timing of the cylinder 5 identified to be of the most advanced ignition is displaced from the above range. When the ignition timing of the cylinder 5 identified to be of the most advanced ignition is significantly displaced, it can be predicted that the greatest possible correction to the valve timing control value cannot put the ignition timing of the cylinder 5 back to the above range. In such a case, the fuel injection amount of the fuel injection valve in the mixer 23 may be corrected at step S105 to a value suppressing the combustion (specifically, the fuel injection amount may be reduced).

Figure 5:
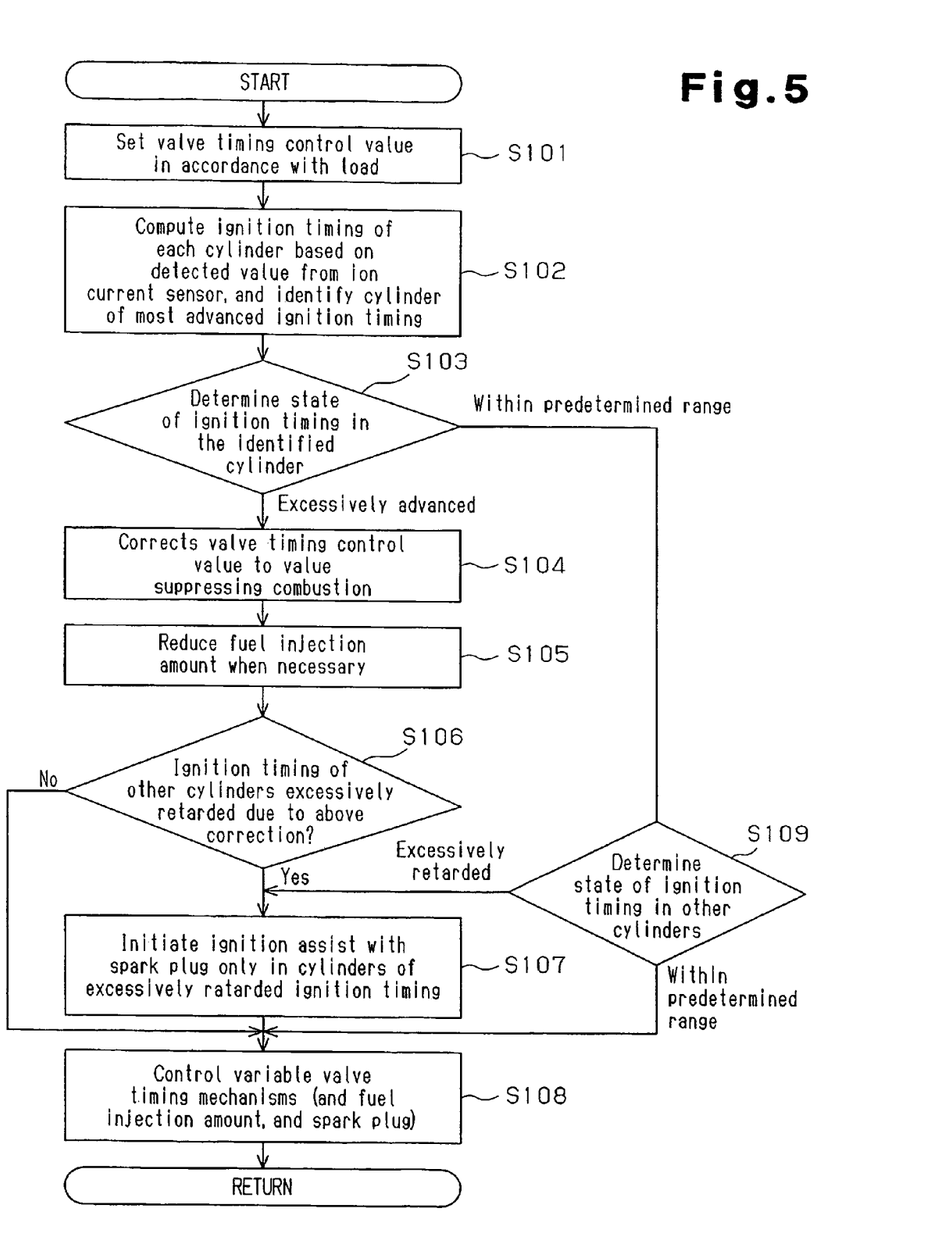
FIG. 5 is a flowchart showing a subroutine of a compression ignition operation process of the internal combustion engine shown in FIG. 1.

To facilitate illustration, the flowchart of FIG. 5 is based on the assumption that no assisted ignition is performed by the spark plug 32 in the cylinder 5 identified to be of the most advanced ignition. Although not shown in FIG. 5, if assisted ignition is performed for the cylinder 5 identified to be of the most advanced ignition, the CPU executes control for deactivating the spark plug 32 of the cylinder 5, and does not executes steps S104 and S105.

The variable valve timing mechanisms 19, 20 of this embodiment each collectively change the valve timing of the intake valves 14 and the exhaust valves 15, respectively. That is, the mechanisms 19, 20 do not change the valve timing of each cylinder 5 independently. The fuel injection valve commonly changes the fuel concentration of the air-fuel mixture supplied to all the cylinders 5. Therefore, as for the cylinders 5 the ignition timing of which is in the appropriate range (1° to 8°), the correction of the valve timing for suppressing the combustion (step S104) or the reduction in the fuel injection amount (step S105) are likely to cause the ignition timing of these cylinders 5 to be below the range. This can cause misfires. Also, there can be a cylinder 5 the combustion state of which has been below the above range from the beginning. In such a cylinder 5, misfire is further likely to occur due to the above described combustion suppression control.

In consideration of the influence of the control of all the cylinder 5 for suppressing combustion (steps S104, S105), whether the ignition timing of each of the cylinders 5 other than the cylinder 5 identified to be of the most advanced ignition is or will be more retarded than the above range (in other words, whether the combustion state becomes or will become a misfire inducing state) is determined based on necessary computation results (at step S106). When the ignition timing of any of the cylinders 5 is excessively retarded (or is predicted to be excessively retarded as a result of the above described correction), the spark plug 32 corresponding to the cylinder 5 the ignition timing of which is judged or predicted to be excessively retarded is activated at step S107, so that the ignition timing of the cylinder 5 enters the above range. If there are no cylinders 5 of excessively retarded ignition timing (or so predicted), step S107 is not executed.

On the other hand, if the ignition timing of the cylinder 5 identified to be of the most advanced ignition is determined to be within the predetermined range (1° to 8°) at step S103, the CPU proceeds to step S109 and checks the ignition timing of the other cylinders 5. If any of the cylinders 5 is delayed and out of the predetermined range (combustion state being shifted to a state causing misfire), the CPU proceeds to step S107 and activates the spark plug 32 corresponding to the cylinder 5. If the ignition timing of all the other cylinders 5 is determined to be in the predetermined range at step S109, the CPU proceeds to step S108 without executing step S107.

At step S108, based on the valve timing control value, which has been set and corrected as necessary, the CPU controls the variable valve timing mechanisms 19, 20 by means of the intake/exhaust valve timing control section 26, thereby actually changing the valve timing. Also, if necessary, fuel injection amount change control and selective ignition of the spark plugs 32 are executed. The CPU thereafter returns to the main routine of FIG. 3.

Since the above described control procedures are executed, when the ignition timing of any of the cylinders 5 is more advanced than the predetermined range, the variable valve timing mechanisms 19, 20 and the fuel injection amount are controlled such that combustion in all the cylinders 5 is suppressed. As for a cylinder 5 that becomes more retarded than the predetermined range due to the combustion suppression control, ignition is assisted by selective ignition of the spark plug 32. Therefore, without a costly and complicated configuration that varies the valve timing and the fuel injection amount for each of the cylinders 5, variation in the combustion states of the cylinders 5 is reduced by causing the ignition timing of all the cylinders 5 to be in the predetermined range. The engine 1 is therefore operated highly efficiently with low emission of NOx.

As described above, the internal combustion engine 1 of this embodiment includes a plurality of cylinders 5, the ion current sensors 24 each capable of detecting the information related to the combustion state of the corresponding cylinder 5, the control apparatus 10 electrically connected to the ion current sensors 24, and the spark plugs 32 each located in one of the cylinders 5. The control apparatus 10 obtains the combustion state of each of the cylinders 5 by means of the ion current sensors 24. If the combustion state of the cylinder 5 of the most violent combustion is beyond the predetermined range, the CPU controls the valve timing of the intake valves 14 and the exhaust valves 15, and the fuel injection amount such that combustion in all the cylinders 5 is suppressed. When the combustion state of any of the cylinders 5 is displaced from the predetermined range to a misfire inducing state, or when the combustion state of any of the cylinders 5 is predicted to be displaced to a misfire inducing state due to the combustion suppression control, the CPU selectively activates the spark plug 32 of the cylinder 5, thereby assisting ignition of the cylinder 5.

Therefore, without a costly and complicated configuration that varies the valve timing and the fuel injection amount for each of the cylinders 5, variation in the combustion states of the cylinders 5 is reduced. The engine 1 is therefore operated highly efficiently with low emission of NOx.

As sensors for detecting the information related to the combustion states of the cylinders 5, the ion current sensors 24 are used in the above embodiment. However, in-cylinder pressure sensors for detecting the pressure in the combustion chambers 16, or knock sensors for detecting engine vibration caused by knocking may be applied. In these cases also, the information related to the combustion state of the combustion chamber 16 of each cylinder 5 is reliably detected.

In the internal combustion engine 1 of this embodiment, the combustion suppression control for putting the ignition timing of the cylinder 5 that has been advanced to outside of the predetermined range back to the predetermined range is first executed by correcting (changing) the valve timing of the intake valves 14 or the exhaust valves 15 (step S104). If the correction of the valve timing fails to put the combustion state back to the predetermined range, change of the fuel injection amount is additionally executed (step S105).

That is, in the internal combustion engine 1 having the fuel supply device and the variable valve timing apparatus common to all the cylinders 5, the process for changing the valve timing that is capable of controlling the combustion state with a good response is executed on a priority basis. When the correction of the valve timing cannot cope with the situation, the fuel injection amount is changed. Accordingly, even if there is a variation among the combustion states in the cylinders 5, a control for eliminating the variation is quickly executed. Further, when such a variation among the combustion states in the cylinders 5 is great, such a situation is appropriately dealt with.

As shown in FIG. 6, the negative valve overlap period T is provided in which the exhaust valve 15 and the intake valve 14 are both closed around the exhaust top dead center in the internal combustion engine 1 of this embodiment. Therefore, since the burned gas (EGR gas) trapped in each cylinder 5 heats air-fuel mixture, the compression ignitability of the mixture is improved.

The control of the valve timing of the intake valves 14 or the exhaust valves 15 for suppressing combustion in all the cylinders 5 (steps S104, S108) are executed for changing the length of the negative valve overlap period T. This changes the amount of the trapped EGR gas, so that the combustion of the all cylinders 5 including the cylinder 5 of excessively violent combustion state is suppressed.

In this embodiment, the ignition of the spark plugs 32 for assisting compression ignition is executed at timing that is advanced relative to the compression top dead center by 30° to 50°. The selective activation (ignition) of the spark plugs 32 may be executed during the negative valve overlap period T. In this case, remaining oxygen in the burned gas reacts with unburned fuel and forms radicals. Thus, in addition to the same advantages as the case where the spark plugs 32 are ignited during normal compression stroke, the compression ignition is assisted in a favorable manner. Since the spark plugs 32 are ignited during the negative valve overlap period T, in which the oxygen concentration is low, generation of NOx by the ignition is suppressed.

Alternatively, it may be configured that during the negative valve overlap period T, the spark plugs 32 of all the cylinders 5 are ignited, and that during the compression stroke, the spark plugs 32 of the cylinders 5 that are displaced from the predetermined range to a state causing misfire are (selectively) ignited. In this case, the ignitability of all the cylinders 5 are ensured by ignition of the spark plugs during the negative valve overlap period T, and variation of the combustion state among the cylinders 5 can be adjusted by selective ignition of the spark plugs 32 during the compression stroke. Particularly, if the above control is executed in a low load operation, in which the fuel injection amount is small, the present invention is advantageous because the variation of the combustion among the cylinders 5 is suppressed while stabilizing the compression ignition.

The above embodiment may be modified as follows.

In the above embodiment, the ignition timing is used as an index for indicating the combustion state of each cylinder 5. The definition of the ignition timing may be varied. Also, as an index indicating the intensity of combustion, parameters other than the ignition timing may be used. For example, in a case where in-cylinder pressure sensors are used, the pressure increase rate dP/dθ, the rate of heat generation dQ/dθ, and the heat production Q may be computed based on the cylinder internal pressure P and the crank angle θ, and one or more of these values may be used for defining a quantitative index indicating the intensity of combustion. For example, the ignition timing may be defined to be a time at which the heat production Q reaches 10% of the entire heat production. The "heat production" refers to the actual heat quantity produced in one cycle in a cylinder and is different from the heat production of the supplied fuel. Since the "heat production" is computed based on the cylinder internal pressure, the value is obtained by taking into consideration the cooling loss.

In the above embodiment, a predetermined range of the combustion state is defined in relation to an absolute reference. Specifically, a range retarded by 1° to 8° from the compression top dead center is used as the predetermined range of combustion state. However, the predetermined range may be defined relatively, for example, as a range of plus or minus certain percent from a target combustion state. In this case, if the combustion state of any cylinder 5 is displaced to a more violent combustion state from the target by an amount of a predetermined percent or more, the compression suppression control is executed for all the cylinders 5. If the combustion state of any cylinder 5 is displaced (predicted to be displaced) to a state causing misfire from the target by an amount of a predetermined percent or more as a result of the combustion compression control, the spark plug 32 of this cylinder 5 is selectively activated.

In the above embodiment, the valve timing of the intake valves 14 and the exhaust valves 15 are both changed at step S104. However, the valve timing of only either of the intake valves 14 or the exhaust valves 15 may be changed. The control of the present invention may be applied to a case where there is not negative valve overlap period T as shown in FIG. 6. For example, as the combustion suppression control (step S104), the actual compressibility may be changed by changing the closing timing of the intake valves 14 in the compression stroke, thereby adjusting the ignitability.

In the above embodiment, the valve timing and the fuel injection amount are both changed as necessary (steps S104, S105). However, only the valve timing or only the fuel injection amount may be changed to execute the combustion suppression control.

In the above embodiment, at steps S104 and S106, the combustion state of the cylinder of the most violent combustion is shifted to a favorable range. Specifically, the ignition timing of the cylinder is shifted to a range retarded by 1° to 8° from the compression top dead center. Alternatively, the combustion state of the cylinder of the most violent combustion may be shifted to an optimum point. For example, the ignition timing of the cylinder may be shifted to the point that is retarded by 4° from the compression top dead center. In the range where the ignition timing is retarded by 1° to 8° from the compression top dead center, noise (and knocking) is in a permissible level, and combustion that is likely to cause misfires is prevented. However, eve if the combustion state is in that range, noise tends to be increased to some degree as the ignition timing is advanced, that is, as the combustion state is made more violent. Therefore, in view of reducing noise, it is effective to shift the combustion state of the cylinder of the most violent combustion to an optimum point, for example, to the point that is retarded by 4° from the compression top dead center.

The invention claimed is:

1. A homogeneous charge compression ignition internal combustion engine comprising:
   a plurality of cylinders;

a sensor for detecting information related to combustion states of the cylinders;

ignition devices, intake valves, and exhaust valves, each cylinder is provided with one of the ignition devices, one of the intake valves, and one of the exhaust valves; and a control apparatus that obtains the information related to the combustion states of the cylinders from the sensor, wherein, based on the information related to the combustion states of the cylinders obtained from the sensor, the control apparatus identifies a cylinder of the most violent combustion, and controls at least one of the valve timing of the intake valves, the valve timing of the exhaust valves, and a fuel injection amount to the cylinders, thereby suppressing the combustion of all the cylinders, such that the combustion state of the identified cylinder becomes an appropriate combustion state, and wherein, as for a cylinder the combustion state of which is out of a predetermined range and is a state causing misfire, the control apparatus selectively activates the corresponding ignition device to perform assisted ignition.

2. The engine according to claim 1, wherein the appropriate combustion state includes the predetermined range, wherein, when the combustion state of the cylinder that has been identified to be of the most violent combustion is displaced to a more violent combustion state from the predetermined range, the control of at least one of the valve timing of the intake valves, the valve timing of the exhaust valves, and the fuel injection amount to the cylinders is executed such that the combustion state of the identified cylinder is shifted to the predetermined range.

3. The engine according to claim 1, wherein the appropriate combustion state includes a predetermined optimum point, wherein, when the combustion state of the cylinder that has been identified to be of the most violent combustion is displaced to a more violent combustion state from the optimum point, the control of at least one of the valve timing of the intake valves, the valve timing of the exhaust valves, and the fuel injection amount to the cylinders is executed such that the combustion state of the identified cylinder is shifted to the optimum point.

4. The engine according to claim 1, wherein the sensor is at least one of an ion current sensor, an in-cylinder pressure sensor, and a knock sensor.

5. The engine according to claim 1, wherein the suppression of combustion of all the cylinders is performed by controlling at least one of the valve timing of the intake valves and the valve timing of the exhaust valves on a priority basis, and wherein, if the combustion states cannot be shifted to the predetermined range by at least one of the control of the valve timing of the intake valves and the control of the valve timing of the exhaust valves, the control of the fuel injection amount to the cylinder is performed additionally.

6. The engine according to claim 1, wherein the intake valves and the exhaust valves are both closed in the vicinity of an exhaust top dead center, so that a negative valve overlap period is present.

7. The engine according to claim 6, wherein at least one of the control of the valve timing of the intake valves and the control of the valve timing of the exhaust valves is performed to change the length of the negative valve overlap period.

8. The engine according to claim 6, wherein the selective activation of the ignition device is performed during the negative valve overlap period.

9. The engine according to claim 6, wherein, during the negative valve overlap period, the control apparatus activates the ignition devices of all the cylinders, and wherein, during a compression stroke, the control apparatus selectively activates the ignition devices.

* * * * *

UNITED STATES PATENT AND TRADEMARK OFFICE
CERTIFICATE OF CORRECTION

PATENT NO. : 7,210,457 B2
APPLICATION NO. : 11/448275
DATED : May 1, 2007
INVENTOR(S) : Hiroshi Kuzuyama It is certified that error appears in the above-identified patent and that said Letters Patent is hereby corrected as shown below:

In the Specification

Column 1, line 7, please delete "to homogeneous" and insert therefore --to a homogeneous--;

Column 1, line 18, please delete "being igniting." and insert therefore --being ignited.--;

Column 1, line 22, please delete "reduction in the emission harmful substances" and insert therefore --and reduction in the emission of harmful substances--;

Column 1, line 24, please delete "One of major" and insert therefore --One of the major--;

Column 1, line 34, please delete "self-ignite." and insert therefore --self-ignites.--;

Column 3, line 22, please delete "drives heat pump cycle" and insert therefore --drives a heat pump cycle--;

Column 3, line 34 and lines 37-38, please delete "low temperature low pressure" and insert therefore --a low-temperature, low-pressure--;

Column 3, line 40, please delete "high temperature high pressure" and insert therefore --a high-temperature, high-pressure--;

Column 4, line 64, please delete "ROM.," and insert therefore --ROM,--;

Column 5, line 24, please delete "does not necessarily" and insert therefore --is not necessarily--;

Column 6, line 41, please delete "than degree to 8 °" and insert therefore --than 8°--;

Column 7, line 25, please delete "not executes" and insert therefore --not execute--;

Column 7, line 44, please delete "cylinder 5" and insert therefore --cylinders 5--;

Column 9, line 21, please delete "heats air-fuel" and insert therefore --heats the air-fuel--;

UNITED STATES PATENT AND TRADEMARK OFFICE
CERTIFICATE OF CORRECTION

PATENT NO. : 7,210,457 B2
APPLICATION NO. : 11/448275
DATED : May 1, 2007
INVENTOR(S) : Hiroshi Kuzuyama

It is certified that error appears in the above-identified patent and that said Letters Patent is hereby corrected as shown below:

Column 9, line 28, please delete "of the all" and insert therefore --of all the--; and Column 10, line 57, please delete "eve if" and insert therefore --even if--.

Signed and Sealed this

Eighth Day of September, 2009

David J. Kappos
*Director of the United States Patent and Trademark Office*